United States Patent
Nagase et al.

(10) Patent No.: US 9,758,686 B2
(45) Date of Patent: Sep. 12, 2017

(54) SOLVENT-BASED INK JET INK COMPOSITION

(71) Applicant: Seiko Epson Corporation, Tokyo (JP)

(72) Inventors: Makoto Nagase, Shiojiri (JP);
Kenichiro Kubota, Matsumoto (JP);
Jun Ito, Shimosuwa (JP); Naoki Koike, Matsumoto (JP)

(73) Assignee: Seiko Epson Corporation (JP)

(*) Notice: Subject to any disclaimer, the term of this patent is extended or adjusted under 35 U.S.C. 154(b) by 7 days.

(21) Appl. No.: 15/045,444

(22) Filed: Feb. 17, 2016

(65) Prior Publication Data

US 2016/0237291 A1 Aug. 18, 2016

(30) Foreign Application Priority Data

Feb. 18, 2015 (JP) ................... 2015-029358

(51) Int. Cl.
  *C09D 11/36* (2014.01)
  *C09D 11/322* (2014.01)
  *C09D 11/10* (2014.01)

(52) U.S. Cl.
  CPC .............. *C09D 11/36* (2013.01); *C09D 11/10* (2013.01); *C09D 11/322* (2013.01)

(58) Field of Classification Search
  CPC .............................. C09D 11/322; C09D 11/36
  See application file for complete search history.

(56) References Cited

U.S. PATENT DOCUMENTS

| 2007/0167538 A1* | 7/2007 | Mochizuki | C09D 11/36 523/160 |
| 2008/0097013 A1* | 4/2008 | Mizutani | C09D 11/36 524/107 |
| 2009/0239980 A1* | 9/2009 | Sugita | C09D 11/106 524/88 |
| 2011/0315049 A1 | 12/2011 | Aoki et al. | |

FOREIGN PATENT DOCUMENTS

| JP | 2010-018730 A | 1/2010 |
| JP | 2012-012432 A | 1/2012 |
| JP | 2012-046671 A | 3/2012 |

* cited by examiner

*Primary Examiner* — Veronica F Faison
(74) *Attorney, Agent, or Firm* — Harness, Dickey & Pierce, P.L.C.

(57) ABSTRACT

A solvent-based ink jet ink composition includes a coloring material; and a solvent; in which the composition includes, as the solvent, two or more types of solvent that are compounds represented by the following general formula (1), and $R^1$, $R^2$, and $R^3$ have the same structure as one another and m are consecutive integers, in the solvent.

$$R^1O-(R^2O)_m-R^3 \qquad (1)$$

(in the formula, $R^1$ is a hydrogen atom or an alkyl group with 1 to 6 carbon atoms, $R^2$ is an alkylene group with 2 or 3 carbon atoms, and $R^3$ is a hydrogen atom, an acetyl group, or an alkyl group with 1 to 4 carbon atoms. However, both of $R^1$ and $R^3$ are not hydrogen atoms. m is an integer of 1 to 7).

7 Claims, No Drawings

SOLVENT-BASED INK JET INK COMPOSITION

BACKGROUND

1. Technical Field

The present invention relates to a solvent-based ink jet ink composition.

2. Related Art

An ink jet recording method that records images and text on a water absorptive recording medium, such as paper, using minute ink droplets which are discharged from the nozzle of an ink jet recording head is known in the related art. An aqueous ink in which water is used as the main solvent has been widely adopted as an ink used in such an ink jet recording method.

On the other hand, in recent years, the ink jet recording method has come to be used for recording to various recording media in various fields. For example, a solvent-based ink composition capable of recording by an ink jet recording method even on a low-absorbency recording medium such as a book printing paper, a synthetic paper or a film is proposed.

JP-A-2012-12432 discloses a solvent-based ink composition containing a hydrocarbon solvent, a solvent having an ester group and an ether group, and a solvent in which both are dissolved. JP-A-2012-46671 discloses a solvent-based ink composition containing an amide solvent. JP-A-2010-18730 discloses a solvent-based ink composition containing three types of alcohol with a high, intermediate, and low boiling point. These solvent-based ink compositions achieve the actions and effects of being able to improve the drying properties after printing, by stipulating any of the solvent compositions.

However, although it is possible for the drying properties of the solvent-based ink composition disclosed in JP-A-12432 to be improved by the hydrocarbon-based solvent, and the solvent having the ester group and the ether group, there is concern of the printing stability worsening because the meniscus portion of the head nozzle is easily influenced by the drying properties.

It is clear that the amide-based solvent contained in the solvent-based ink composition disclosed in JP-A-2012-46671 instead has worsened drying properties after printing because the absorbency is high. It is inferred that these are compositions in which there are ether bonds in the chemical structure of the amide-based solvent, and the ether bonds increase the absorbency.

Although it is possible for the drying properties of the solvent-based ink composition disclosed in JP-A-2010-18730 to be improved by three types of alcohol with differing boiling points being combined, there is concern of the printing stability worsening because the meniscus portion of the head nozzle is easily influenced by the drying properties.

As outlined above, in the solvent-based ink compositions of the related art, it is difficult for both printing stability from the head nozzle and drying properties of the printed matter to be achieved. It is important not only for both of these actions and effects to be achieved, but also to ensure improvements in the printing quality, that is, to avoid unevenness in the printed matter, and ensure gloss and line width.

SUMMARY

An advantage of some aspects of the invention is to provide a solvent-based ink jet ink composition that is able to ensure gloss and line width while preventing unevenness in the printed matter by having favorable printing stability and balancing the drying properties of the printed matter and the wetting and spreading of the ink on the medium.

The invention can be realized in the following forms or application examples.

Application Example 1

According to an aspect of the invention, there is provided a solvent-based ink jet ink composition, including a coloring material; and a solvent; in which the composition includes, as the solvent, two or more types of solvent that are compounds represented by the following general formula (1), and $R^1$, $R^2$, and $R^3$ have the same structure as one another and m are consecutive integers, in the solvent.

$$R^1O\text{—}(R^2O)_m\text{—}R^3 \qquad (1)$$

(in the formula, $R^1$ is a hydrogen atom or an alkyl group with 1 to 6 carbon atoms, $R^2$ is an alkylene group with 2 or 3 carbon atoms, and $R^3$ is a hydrogen atom, an acetyl group, or an alkyl group with 1 to 4 carbon atoms. However, both of $R^1$ and $R^3$ are not hydrogen atoms. m is an integer of 1 to 7.)

According to the solvent-based ink jet ink composition of Application Example 1, it is possible to achieve a balance in the drying properties of the printed matter and the wetting and spreading behavior of the ink on the medium by blending two or more types of solvent with a difference of only one in the number of added mols of the oxyalkylene group that is the main skeleton in the structure of the compound represented by the above general formula (1). In so doing, the reliability (that is, the printing stability), such as clogging of the meniscus is improved compared to a case of using a combination of a plurality of solvents with differing structures. Because the compatibility between solvents is superior, it is possible to ensure gloss and line width of the printed matter while preventing unevenness in the printed matter.

Application Example 2

In the solvent-based ink jet ink composition according to Application Example 1, two or more types of solvent in which one of $R^1$ and $R^3$ in the general formula (1) is a hydrogen atom and another is an alkyl group may be included as the two or more types of solvent.

Application Example 3

In the solvent-based ink jet ink composition according to Application Example 1 or 2, two or more types of solvent in which the number of carbon atoms of $R^2$ in the general formula (1) is 2 may be included as the two or more types of solvent.

Application Example 4

In the solvent-based ink jet ink composition according to any one of Application Examples 1 to 3, three or more types of solvent in which m in the general formula (1) are continuously consecutive integers may be included as the two or more types of solvent.

Application Example 5

In the solvent-based ink jet ink composition according to Application Example 4, n continuously consecutive types of solvent (n is an integer of 3 or more) may be included, an integer in which the decimal of n/3 is rounded down may be A, and the ratio (X) of the total content of the remaining solvent in the ink, excluding the Ath solvent in which m increases from the solvent with the smallest m and the Ath solvent in which m decreases from the largest m of the n types of solvent to the total content of the n types of solvent in the ink may be 40 mass % or more.

Application Example 6

In the solvent-based ink jet ink composition according to any one of Application Examples 1 to 5, the total content of the two or more types of solvent may be 2 mass % or more to 50 mass % or less when the total mass of the ink composition is 100 mass %.

Application Example 7

In the solvent-based ink jet ink composition according to any one of Application Examples 1 to 6, a lactone may be further included as the solvent.

Application Example 8

In the solvent-based ink jet ink composition according to any one of Application Examples 1 to 7, one type selected from a group consisting of an organic pigment, a metal oxide pigment, and carbon black may be included as the coloring material.

DESCRIPTION OF EXEMPLARY EMBODIMENTS

Below, favorable embodiments of the invention will be described. The embodiments described below are for describing an example of the invention. The invention is not limited by the following embodiments and includes various modifications carried out in a range not departing from the gist of the invention.

In the invention, the wording "solvent-based ink composition" refers to an ink composition for which an organic solvent is the main solvent, and water is not the main solvent. It is preferable that the content of water in the ink is 3 mass % or less, 1 mass % or less is more preferable, less than 0.05 mass % is still more preferable, less than 0.01 mass % is still more preferable, less than 0.005 mass % is still more preferable, and less than 0.001 mass % is most preferable. Alternatively, the ink composition may be one not substantially containing water. The wording "not substantially containing" indicates not being intentionally contained.

1. SOLVENT-BASED INK JET INK COMPOSITION

The solvent-based ink jet ink composition of the embodiment (below, also referred to simply as "ink composition") contains a coloring material and a solvent. Below, each component included in the ink composition according to the embodiment will be described.

1.1. Color Material

The ink composition according to the embodiment contains a coloring material. Although it is possible to use a dye or a pigment as the coloring material, it is preferable that a pigment is used from the viewpoint of having water resistance, gas resistance, light resistance, and the like.

Although it is possible to use any inorganic pigment or organic pigment known in the related art as the pigment, it is preferable to include one type selected from a group consisting of an organic pigment, a metal oxide pigment, and carbon black. Examples of the organic pigment include azo pigments such as azo lake, insoluble azo pigments, condensed azo pigments, and chelate azo pigments; polycyclic pigments such as phthalocyanine pigments, perylene and perylene pigments, anthraquinone pigments, quinacridone pigment, dioxazine pigments, thioindigo pigments, isoindolinone pigments, and quinophthalone pigments; dye lakes such as basic dye-type lakes, and acid dye-type lakes; nitro pigments, nitroso pigments, aniline black, and daylight fluorescent pigments. Examples of the inorganic pigment include carbon black; and metal oxide pigments such as titanium dioxide, zinc oxide, and chromium oxide.

Examples of the pigment for magenta or red include, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, and C.I. Pigment Red 254.

Examples of the orange or yellow pigment include C.I. Pigment Orange 31, C.I. Pigment Orange 43, C.I. Pigment Orange 64, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 150, C.I. Pigment Yellow 155, and C.I. Pigment Yellow 180.

Examples of the green or cyan pigment include C.I. Pigment Blue 15, C.I. Pigment Blue 15:2, C.I. Pigment Blue 15:3, C.I. Pigment Blue 16, C.I. Pigment Blue 60, C.I. Pigment Green 7, and C.I. Pigment Green 36.

Examples of the black pigment include carbon black. Examples of the white pigment include C.I. Pigment White 6, C.I. Pigment White 18, and C.I. Pigment White 21.

These pigments may be used independently or may be used with two or more types mixed. Although the average primary particle diameter is not particularly limited, 50 nm or more to 500 nm or less is preferable.

Although it is possible to select, as appropriate, the content of the coloring material according to the usage and the printing characteristics, it is preferable that the content is 0.5 mass % or more to 20 mass % or less when the total mass of the ink composition is 100 mass %, and 1 mass % or more to 10 mass % or less is more preferable.

From the viewpoint of uniformly and stably dispersing the coloring material in the ink composition, it is preferable that the coloring material is dispersed using a dispersant. Specifically, it is possible to prepare the ink composition by mixing the dispersant obtained by adding the a coloring material to the resultant after the dispersant and the solvent are sufficiently mixed under stirring, and further mixing under stirring with the remaining solvent or added components. Specific examples of such a dispersant include polyester polymer compounds such as Hinoact KF1-M, T-6000, T-7000, T-8000, T-8350P, and T-8000E (all manufactured by Takefu Fine Chemical Co., Ltd.), Solsperse 20000, 24000, 32000, 32500, 33500, 34000, 35200, and 37500 (all manufactured by LUBRIZOL Co., Ltd.), Disperbyk-161, 162, 163, 164, 166, 180, 190, 191, and 192 (all manufactured by BYK-Chemie Japan Co., Ltd.), Flowlen DOPA-17, 22, 33, and G-700 (all manufactured by Kyoeisha Chemistry Co., Ltd.), Ajisper PB821, and PB711 (all manufactured by Ajinomoto Fine-Techno Co., Inc.), and LP4010, LP4050, LP4055, POLYMER 400, 401, 402, 403, 450, 451, and 453 (all manufactured by EFKA Chemicals Co., Ltd.).

Although it is possible to select, as appropriate, the content ratio of the dispersant according to the type of coloring material, the content ration is preferably 5 parts by mass or more to 200 parts by mass or less to 100 parts by mass of the content of the coloring material in the ink composition, and more preferably 30 parts by mass to 120 parts by mass or less.

1.2. Solvent

Although the ink composition according to the embodiment contains a solvent, the ink composition includes two or more types of solvent (below, also referred to as "specified solvent group") that are compounds represented by the following general formula (1) for which $R^1$, $R^2$, and $R^3$ in the solvents have the same structure and m are consecutive integers.

$$R^1O—(R^2O)_m—R^3 \quad (1)$$

(in the formula, $R^1$ is a hydrogen atom or an alkyl group with 1 to 6 carbon atoms, $R^2$ is an alkylene group with 2 or 3 carbon atoms, and $R^3$ is a hydrogen atom, an acetyl group, or an alkyl group with 1 to 4 carbon atoms. However, both of $R^1$ and $R^3$ are not hydrogen atoms. M is an integer of 1 to 7.)

In the above general formula (1), $R^1$ represents a hydrogen atom or an alkyl group with 1 to 6 carbon atoms. It is possible for the "alkyl group with 1 to 6 carbon atoms" to be a linear or a branched alkyl group, and examples thereof include a methyl group, an ethyl group, an n-propyl group, an iso-propyl group, an n-butyl group, an isobutyl group, a sec-butyl group, a tert-butyl group, an n-pentyl group, an isopentyl group, a tert-pentyl group, an n-hexyl group, and an isohexyl group. However, in a case where $R^1$ is a hydrogen atom, $R^3$ is not a hydrogen atom.

In the general formula (1), $R^2$ represents an alkyl group with 2 or 3 carbon atoms. Specifically, $R^2$ represents an ethylene group or a propylene group.

In the above general formula (1), $R^3$ represents a hydrogen atom, an acetyl group, or an alkyl group with 1 to 4 carbon atoms. It is possible for the "alkyl group with 1 to 4 carbon atoms" to be a linear or a branched alkyl group, and examples thereof include a methyl group, an ethyl group, an n-propyl group, an iso-propyl group, an n-butyl group, an isobutyl group, a sec-butyl group, and a tert-butyl group. However, in a case where $R^3$ is a hydrogen atom, $R^1$ is not a hydrogen atom.

m in the above general formula (1) represents the number of added mols of an oxyalkylene group. From the viewpoint of achieving a balance in the drying properties of the printed matter and the wetting and spreading behavior of the ink on the medium, it is preferable that m is 3 to 6, and 3 to 5 is more preferable.

Specific examples of the compound represented by the general formula (1) include glycol monomethyl ethers, such as methyl glycol, methyl diglycol, methyl triglycol, isopropyl glycol, isopropyl diglycol, butyl glycol, butyl diglycol, butyl triglycol, iso-butyl glycol, isobutyl diglycol, hexyl glycol, hexyl diglycol, methyl propylene glycol, methyl propylene diene glycol, methyl propylene triglycol, propyl propylene glycol, propyl propylene diglycol, butyl propylene glycol, butyl propylene diglycol, butyl propylene triglycol, and methyl propylene glycol acetate; and glycol ethers, such as dimethyl glycol, dimethyl diglycol, dimethyl triglycol, methyl ethyl diglycol, diethyl diglycol, dibutyl glycol, and dimethyl propylene diglycol.

A balance in the drying properties of the printed matter and the wetting and spreading behavior of the ink on the medium can be achieved by blending two or more types of solvent with a difference of only one in the number of added mols of the oxyalkylene group that is the main skeleton in the structure of the compound represented by the above general formula (1). While the compatibility between the glycol ethers and dialkyl glycol ethers for which only the number of added mols of the oxyalkylene group differs by one is superior because of the similar structures, the standard boiling points, viscosities, and balance of hydrophilicity and hydrophobicity are different, and it is determined that this is particularly suitable to adjusting the balance in the drying properties of the printed matter and the wetting and spreading behavior of the ink on the medium. In so doing, it is determined that it is possible for the reliability, such as clogging of the meniscus (that is, printing stability), to be improved and to ensure gloss and line width of the printed matter while preventing unevenness in the printed matter, compared to a case of combining a plurality of solvents with different structures.

In the specified solvent group, solvents in which $R^3$ is a hydrogen atom or an alkyl group with 1 to 4 carbon atoms are particularly preferable for the feature of much superior printing unevenness, glossiness and dot size. A glycol monoether in which one of $R^1$ and $R^3$ in the general formula (1) is a hydrogen atom and the other is an alkyl group is preferable as the specified solvent group from the viewpoint of drying properties and glossiness of the printed matter. An ethylene glycol (mono- or di-) ether in which $R^2$ in the general formula (1) is two carbon atoms is preferable as the specified solvent group from the viewpoint of drying properties of the printed matter and printing stability. Accordingly, ethylene glycol monoether is more preferable as the specified solvent group.

It is preferable that the ink composition according to the embodiment includes three or more types of solvent in which m in the general formula (1) are continuously consecutive integers as the specified solvent group. The balance in the drying properties of the printed matter and the wetting and spreading behavior of the ink on the medium can be more precisely controlled by using three or more types of solvent as the specified solvent group. In so doing, it is possible for the printing stability to be effectively improved, and to ensure gloss and line width of the printed matter while preventing unevenness in the printed matter.

In a case of including n or more types of solvent (n is an integer of 3 or more) as the specified solvent group, it is preferable that an integer in which the decimal of n/3 is rounded down is A, and the ratio (X) of the total content of the remaining solvent in the ink, excluding the Ath solvent in which m increases from the solvent with the smallest m and the Ath solvent in which m decreases from the largest m of the n types of solvent to the total content of the n types of solvent in the ink is 40 mass % or more.

When the ratio (X) is specifically, described, the content of the solvent corresponding to the number in the center of the consecutive integers is included at 40 mass % or more in the specified solvent group in a case where three or more types of solvent are included as the specified solvent group. In a case where four or more types of solvent are included as the specified solvent group, the content of the solvents corresponding to the two numbers in the center of the consecutive integers is included at 40 mass % or more in the specified solvent group. The balance in the drying properties of the printed matter and the wetting and spreading behavior of the ink on the medium can be more precisely controlled by using such a content ratio. In so doing, it is possible for the printing stability to be effectively improved, and to ensure gloss and line width of the printed matter while preventing unevenness in the printed matter. On this point, it is more preferable that the ratio (X) is 50 mass % or more, 60 mass % or more is still more preferable, 70 mass % or more is particularly preferable, and 80 mass % or more is more particularly preferable.

It is preferable that the total content of the specified solvent group in the ink composition according to the embodiment is 2 mass % or more to 50 mass % or less when the total mass of the ink composition is 100 mass %, and 10 mass % or more to 45 mass % or less is more preferable. When the total content of the specified solvent group is within the above ranges, it is possible to achieve a balance in the drying properties of the printed matter and the wetting and spreading behavior of the ink on the medium. The content of the total of the one or more type of solvent in which the specified solvent group or not the specified solvent group corresponds to the general formula (1) with respect to the total mass of the ink composition is preferable 40 mass % or more for the feature of printing unevenness, glossiness, dot size, surface drying properties and the like, 50 mass % or more is more preferable, 60 mass % or more is yet more preferable, 70 mass % or more is particularly preferable, and the upper limit is preferably 98% or less.

It is preferable for the ink composition according to the embodiment to contain a lactone. It is possible for the ink composition to be caused to permeate into the interior of the recording medium while dissolving a portion of the low absorbency recording medium (for example, vinyl chloride resin) by containing a cyclic lactone. It is possible for the abrasion resistance of the image recorded on the recording medium to be improved by the ink composition permeating to the interior of the recording medium in this way.

In the invention, the wording "lactone" generally refers to cyclic compound having an ester group (—CO—O—) in the ring. Although not limited as long as it is included in the above definition, it is preferable that the lactone is a lactone having 2 to 9 or fewer carbon atoms. Although specific examples of such a lactone include α-ethyl lactone, α-acetolactone, β-propiolactone, γ-butyrolactone, δ-valerolactone, ε-caprolactone, ζ-enantiolactone, η-caprylolactone, γ-valerolactone, γ-heptalactone, γ-nonalactone, β-methyl-δ-valerolactone, 2-butyl-2-ethyl-propiolactone, and α,α-di-ethyl propiolactone, and among these γ-butyrolactone is particularly preferable. The lactones given as examples above may be used independently, or may be used with two or more types mixed.

The content of the lactone is preferably 5 mass % or more to 40 mass % or less when the total mass of the ink composition is 100 mass %, 10 mass % or more to 30 mass % or less is more preferable, and 10 mass % or more to 20 mass % or less is particularly preferable. By the content of the lactone being within the above ranges, it becomes easier to improve the abrasion resistance of the recorded image and maintain the glossiness.

The ink composition according to the embodiment may contain a solvent other than the specified solvent group. That is, also among the compounds given as examples as the glycol monoether and the glycol diether, another solvent that does not configure the specified solvent group may be contained in the ink composition. The ink composition according to the embodiment may contain a solvent such as an ester, a ketone, an alcohol, an amide, an alkane diol, and a pyrrolidone other than the compounds given as examples above.

1.3. Other Components

A component other than the above may be further added to the ink composition according to the embodiment. Examples of such components include surfactants, resins, chelating agents, preservatives, viscosity adjusters, dissolution aids, antioxidants, and anti-fungal agents.

1.3.1. Surfactant

From the viewpoint of decreasing the surface tension to improve the wettability with the recording medium, a polyoxyethylene derivative which is a silicon surfactant, a fluorine-based surfactant, or a non-ionic surfactant may also be added to the ink composition according to the embodiment.

As the silicon surfactant, it is preferable to use a polyester-modified silicon or a polyether-modified silicon. Specific examples thereof include BYK-315, 315N, 347, and 348, BYK-UV 3500, 3510, 3530, and 3570 (all manufactured by BYK-Chemie Japan Co., Ltd.).

It is preferable to use a fluorine-modified polymer as the fluorine-based surfactant, and specific examples include BYK-340 (manufactured by BYK-Chemie Japan Co., Ltd.).

It is preferable to use an acetylene glycol surfactant as the polyoxyethylene derivative. Specific examples include Surfynol 82, 104, 465, 485, and TG (all manufactured by Air Products and Chemicals Japan Inc.), Olefin STG, and E1010 (all manufactured by Nissin Chemical Industry Co., Ltd.), Nissan Nonion A-10R, and A-13R (all manufactured by NOF Corporation), Flowlen TG-740W, and D-90 (manufactured by Kyoeisha Chemistry Co., Ltd.), and Noigen CX-100 (manufactured by Dai-ichi Kogyo Seiyaku Co., Ltd.).

The content of the surfactant in the ink composition according to the embodiment is preferably 0.05 mass % or more to 3 mass % or less, and more preferably 0.5 mass % or more to 2 mass % or less.

1.3.2. Resin

The ink composition according to the embodiment may contain a resin (below, also referred to as a "fixing resin") for causing the above-described coloring material to be fixed to the recording material.

Examples of the fixing resin include fibrous resins such as acrylic resins, styrene acrylic resins, rosin modified resins, phenol resins, terpene resins, polyester resins, polyamide resins, epoxy resins, vinyl acetate resins, vinyl chloride resins, and cellulose acetate butyrates; and vinyl toluene-α-methyl styrene copolymer resins. Among these, it is preferable that at least one type of resin is selected from a group consisting of an acrylic resin and a vinyl chloride resin. By containing these fixing resins, it is possible for the fixability to the recording medium to be improved and to also improve the abrasion resistance.

It is preferable that the solid content of the fixing resin in the ink composition according to the embodiment is 0.05 mass % or more to 15 mass % or less, and 0.1 mass % or more to 10 mass % or less is more preferable. When the content of the fixing resin is within the above ranges, superior fixability to the low absorbency recording medium is obtained.

Acrylic Resin

It is possible to use a copolymer formed from polymerizable monomers known in the related art as the acrylic resin. It is possible to use acrylic esters, such as methyl acrylate, ethyl acrylate, isopropyl acrylate, n-butyl acrylate, and 2-ethylhexyl acrylate; methacrylic esters, such as methyl methacrylate, ethyl methacrylate, isopropyl methacrylate, n-butyl methacrylate, isobutyl methacrylate, t-butyl methacrylate, cyclohexyl methacrylate, and 2-ethylhexyl methacrylate; carboxyl group-containing monomers such as Acrylic acid, methacrylic acid, maleic acid, fumaric acid, itaconic acid, maleic acid mono-n-butyl, fumaric acid mono-n-butyl, itaconic acid mono-n-butyl, and Hydroxyl group-containing (meth)acrylate, amide group-containing monomers, glycidyl group-containing monomers, cyano group-containing monomers, hydroxyl group-containing allyl compounds, tertiary amino group-containing monomer, an alkoxysilyl group-containing monomers and the like as the polymerizable monomer, either independently or in a combination of a plurality of types.

Commercially available acrylic resins may be used, and examples thereof include ACRYPET MF (trade name, manufactured by Mitsubishi Rayon Co., Ltd., acrylic resin), SUMIPEX LG (trade name, manufactured by Sumitomo Chemical Co., Ltd., acrylic resin), Paraloid B-series (trade name, Rohm and Haas Co., Ltd., acrylic resin), and PARAPET G-1000P (trade name, Kuraray Co., Ltd., acrylic resin). In the invention, the wording "(meth)acrylic acid" refers to both acrylic acid and methacrylic acid, and the wording "(meth)acrylate" refers to both acrylate and methacrylate.

Vinyl Chloride Resin

Although examples of the vinyl chloride resin include copolymers of vinyl chloride and another monomer such as vinyl acetate, vinylidene chloride, acrylic acid, maleic acid, and vinyl alcohols, among these, a copolymer (below, also referred to as a "vinyl acetate copolymer") included structural units derived from vinyl chloride and vinyl acetate is preferable, and a vinyl acetate copolymer with a glass-transition temperature of 60° C. to 80° C. is more preferable.

It is possible for the vinyl acetate copolymer to be obtained using normal methods, for example, possible to obtain the copolymer through suspension polymerization. Specifically, it is possible to incorporate water, a dispersant, and a polymerization initiator in a polymerization vessel, and after degassing, pressurize vinyl chloride and a vinyl acetate to perform suspension polymerization, or to pressurize a portion of the vinyl chloride and the vinyl acetate for a reaction to be started, and perform suspension polymerization while pressurizing the remaining vinyl chloride during the reaction.

It is preferable for the vinyl acetate copolymer to contain 70 to 90 mass % of vinyl chloride units as the configuration thereof. If within the above range, the long term storage stability is superior because the vinyl acetate copolymer is stably dissolved in the ink composition. It is further possible to obtain superior discharge stability and superior fixability to the recording medium.

The vinyl acetate copolymer may include other constituent units, as necessary, along with the vinyl chloride units and the vinyl acetate units, and examples thereof include carboxylic acid units, vinyl alcohol units, and hydroxyalkyl acrylate units, and, above all, preferable examples include vinyl alcohol. It is possible to obtain the vinyl acetate copolymer using monomers corresponding to each of the above-described units. Specific examples of the monomer provided with the carboxylic acid include maleic acid, itaconic acid, maleic anhydride, itaconic anhydride, acrylic acid, and methacrylic acid. Specific examples of the monomeric unit provided with the hydroxyalkyl acrylate unit include hydroxyethyl (meth) acrylate and hydroxyethyl vinyl ethyl. Although the content of these monomers is not limited as long as the effect of the invention is not impeded, it is possible for the monomers to be copolymerized in a range of a total amount of monomers of 15 mass % or less.

Commercially available vinyl acetate copolymers may be used, and examples thereof include SOLBIN CN, SOLBIN CNL, SOLBIN C5R, SOLBIN TA5R, SOLBIN CL, and SOLBIN CLL (all manufactured by Nissin Chemical Industry Co., Ltd.).

Although the average degree of polymerization of these resins is not particularly limited, 150 to 1100 is preferable, and 200 to 750 is more preferable. In a case where the average degree of polymerization of the resins is within the above ranges, the long term storage stability is superior because the copolymers stably dissolve in the ink composition according to the embodiment. It is further possible to obtain superior discharge stability and superior fixability to the recording medium. It is possible for the average degree of polymerization of the resins to be obtained compliant with the method of calculating the average degree of polymerization disclosed in "JIS K6720-2" in which the specific viscosity is measured and the average degree of polymerization calculated therefrom.

Although not particularly limited, it is preferable that the number average molecular weight of the resins is 10,000 to 50,000, and 12,000 to 42,000 is more preferable. It is possible for the number average molecular weight to be obtained as a polystyrene converted relative value that can be measured by GPC.

1.3.3. Others

It is possible for the ink composition according to the embodiment to contain substances for imparting predetermined capabilities, such as chelating agents such as ethylenediamine tetraacetate (EDTA), preservatives, viscosity adjusters, dissolution aids, antioxidants, and anti-fungal agents, in addition to the above-described components.

1.4. Physical Properties

In a case of using the ink composition according to the embodiment as an ink for an ink jet, it is preferable that the viscosity (viscosity at 25° C.) is made 2 mPa·s or higher to 20 mPa·s or less by adjusting the constitution or blend, and 3 mPa·s or more to 15 mPa·s or less is more preferable. In so doing, it is possible for the discharge stability (such as stability of discharge amount, flight characteristics of droplets), discharge responsiveness (such as response speed, high frequency correspondence (frequency response characteristics)) of the ink jet ink composition to be particularly superior. It is possible for the viscosity of the ink jet ink to be obtained through JIS Z8809 compliant measurement using a vibration-type viscometer.

It is preferable that the ink composition according to the embodiment has a surface tension at 20° C. of 20 mN/m or higher to 50 mN/m, and 25 mN/m or more to 40 mN/m or less is more preferable, from the viewpoint of balance between recording quality and reliability as an ink jet ink. It is possible for the measurement of the surface tension to be measured by verifying the surface tension when a platinum plate is wetted with ink in an environment of 20° C. by using a Full Automatic Surface Tensiometer CBVP-Z (manufactured by Kyowa Interface Science Co., Ltd.).

1.5. Use

The ink composition according to the embodiment is suitable to usage for signs exhibited outdoors because the image quality when recorded on a low absorbency recording medium is particularly superior.

In the present specification, the term "low absorbency recording medium" refers to a recording medium in which the water absorption amount in the Bristow method from the beginning of contact to 30 msec$^{1/2}$ is 10 mL/m$^2$ or less, and the recording surface should at least have this property. According to this definition, a non-absorbent recording medium which does not absorb water at all is also included in the wording "low absorbency recording medium" in the invention. The Bristow method is the most widespread method used as a method of measuring a liquid absorption amount in a short time, and is also employed by the Japan Technical Association of the Pulp and Paper Industry (JAPAN TAPPI). The details of the testing method are disclosed in the standard No. 51 "Paper and Cardboard—Liquid Absorbency Test Method—Bristow Method" of the "JAPAN TAPPI Paper Pulp Test Method 2000 Editing".

Specific examples of the low absorbency recording medium include sheets containing a low absorbency material; films, and textile products. The low absorbency recording medium may also include a layer including a material with low absorbency (below, also referred to as a "low absorbency layer") provided on the surface of the base material (for example, paper, fiber, leather, plastic, glass, ceramics, metal, and the like). Although not particularly limited, examples of the low absorbency material include olefin resins, ester resins, urethane resins, acrylic resins, and vinyl chloride resins.

Among these, it is possible to preferably use a recording medium having a recording surface which includes a vinyl chloride resin as the low absorbency recording medium. Specific examples of the vinyl chloride resin include vinyl chloride copolymer resins such as polychlorinated vinyl resin, vinyl chloride-ethylene copolymer resin, vinyl chloride-vinyl acetate copolymer resin, vinyl chloride-vinyl ether copolymer resin, vinyl chloride-vinylidene chloride copolymer resin, vinyl chloride-maleic acid ester copolymer resin, vinyl chloride-(meth)acrylic acid copolymer resin, vinyl chloride-(meth)acrylic ester copolymer resin, and vinyl chloride-urethane copolymer resin. The various characteristics such as the thickness, shape, color, softening temperature, and the hardness of the low absorbency recording medium are not particularly limited.

Although the ink composition according to the embodiment can record an image on an untreated surface on a vinyl chloride resin base material, and has a superior effect of making a high cost recording medium unnecessary resembling the recording medium having an absorbing layer of the related art, it goes without saying that it is possible for the ink composition to also be applied to a base material subjected to surface treatment by an ink absorbing layer.

2. EXAMPLES

Hereinafter, the invention will be Specifically, described using the examples; however, the invention is not limited to these examples. Unless otherwise noted, the wording "parts" and "%" in the examples and comparative examples is based on mass.

2.1. Preparation of Ink Composition

An amount of various organic solvents corresponding to the concentrations disclosed in Tables 1 was introduced into each respective ink, the resultant was mixed under stirring for 30 minutes using a magnetic stirrer to obtain a mixed solvent.

A dispersant with an average particle diameter of 130 nm was obtained by separating a portion of the obtained mixed solvent, mixing Solsperse 37500 (manufactured by Lubrizol Co., Ltd., trade name, dispersion resin), thereafter adding C.I. Pigment Blue 15:3 (manufactured by Clariant International Ltd., copper phthalocyanine pigment), and performing preliminary dispersion using a homogenizer, then performing dispersion treatment using a bead mill charged with zirconia beads with a diameter or 0.3 mm.

Separately, a portion of the mixed solvent was separated, and PARAPET G-1000P (manufactured by Kuraray Co., Ltd., methacrylic resin) was added under stirring, and completely dissolved to obtain a resin solution.

After adding the remaining mixed solvent, BYK-340 (manufactured by BYK-Chemie Japan Co., Ltd., fluorine-based surfactant) and the resin solution to the obtained dispersant, and further mixing under stirring for one hour, the cyan ink composition disclosed in Table 1 was obtained by filtering the resultant with a PTFE membrane filter with a pore diameter of 5 μm. The numerical values in the tables indicate mass %.

2.2. Evaluation Testing 2.2.1. Evaluation of Printing Unevenness

Solid printing was performed with each ink at a concentration of 100% on a vinyl chloride banner sheet (manufactured by 3M Limited, "IJ51") using an ink jet printer (manufactured by Seiko Epson Corp., model number "SC-S30650"), and dried for 60 minutes. Thereafter, the printing surface was observed visually and using an optical microscope and then evaluated on scale of 1 to 6 with 6 points as no printing unevenness. The evaluation criteria are as follows.

6 to 5 points: acceptable, no unevenness on printing surface 4 to 1 points: unacceptable, apparent printing unevenness on printing surface 2.2.2. Evaluation of Gloss Solid printing was performed with each ink at a concentration of 100% on a glossy vinyl chloride banner sheet (manufactured by Roland DG Corporation, "SV-G-1270G") using an ink jet printer (manufactured by Seiko Epson Corp., model number "SC-S30650"), and dried for one day at room temperature to obtain a print sample. Thereafter, the 20° gloss of the solid printing portion was measured with a MULTI GLOSS 268 (manufactured by KONICA MINOLTA, Inc.). The evaluation standard is as follows, and a case of 6 to 4 points is determined to be an acceptable gloss, and a case of 3 to 1 points is determined to be an unacceptable gloss.

6 points: 20° gloss of 34 or more
5 points: 20° gloss of 32 or more to less than 34
4 points: 20° gloss of 30 or more to less than 32
3 points: 20° gloss of 28 or more to less than 30
2 points: 20° gloss of 26 or more to less than 28
1 point: 20° gloss of less than 26

2.2.3. Test to Determine Dot Size

A 1 by 3 cm square was printed with each ink at a concentration of 30% on a vinyl chloride banner sheet (manufactured by 3M Limited, "IJ51") using an ink jet printer (manufactured by Seiko Epson Corp., model number "SC-S30650"), and dried for 60 minutes. Subsequently, the dot size was observed using an optical microscope, and the diameter was categorized for every 10 μm. Cases where there is significant bleeding are not measurable because the dot shape does not become circular. Meanwhile, although the dot shape approaches a true circle in cases where there is little bleeding, the dot size becomes smaller. The evaluation criteria are as follows, and a case of 6 to 4 points is determined to be acceptable, and a case of 3 to 1 points is determined to be unacceptable.

6 points: dot size greater than 60 μm
5 points: dot size greater than 50 μm to 60 μm or less
4 points: dot size greater than 40 μm to 50 μm or less
3 points: dot size greater than 30 μm to 40 μm or less
2 points: dot size greater than 20 μm to 30 μm or less
1 point: dot size 20 μm or less

2.2.4. Surface Drying Properties Test

Solid printing was performed with each ink at a concentration of 100% on a glossy vinyl chloride banner sheet (manufactured by Roland DG Corporation, "SV-G-1270G") using an ink jet printer (manufactured by Seiko Epson Corp., model number "SC-S30650"), and dried for five minutes. Next, scratching of the printing surface after being wound using the winding apparatus was observed. The observation method calculated the proportion of the area having scratching by measuring the surface roughness with a laser microscope (manufactured by Keyence Corporation, model number VK-8700 Generation 2). The evaluation standard is as follows, and a case of 6 to 4 points is determined to be acceptable surface drying properties, and a case of 3 to 1 points is determined to be unacceptable surface drying properties.

6 points: no scratching area
5 points: scratching area greater than 0% to 10% or less
4 points: scratching area greater than 10% to 20% or less
3 points: scratching area greater than 20% to 30% or less
2 points: scratching area greater than 30% to 40% or less
1 points: scratching area greater than 40%

2.3. Evaluation Result

The constitution of the ink composition in each example and comparative example, and the evaluation results are shown in Table 1 below.

Meanwhile, according to the ink composition in Comparative Examples 1 to 6 not containing the specified solvent group, the results become unacceptable at any of the evaluation items, and the ink composition does not have a superior balance.

The invention is not limited to the embodiments described above, and various modifications thereof are possible. The invention includes configurations which are the substantially the same as the configurations described in the embodiments (for example, configurations having the same function, method and results, or configurations having the same purpose and effect). The invention includes configurations in which non-essential parts of the configurations described in the embodiments are replaced. The invention includes configurations exhibiting the same actions and effects as the configurations described in the embodiments or configurations capable of achieving the same purpose. The invention includes configurations in which known techniques were added to the configurations described in the embodiments.

The entire disclosure of Japanese Patent Application No. 2015-029358, filed Feb. 18, 2015 is expressly incorporated by reference herein.

What is claimed is:

1. A solvent-based ink jet ink composition, comprising:
a coloring material; and
a solvent,

TABLE 1

| | Ink Constitution | Examples | | | | | | | | Comparative Examples | | | | | |
|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 |
| Coloring Material | PB.15:3 | 4 | 4 | 4 | 4 | 4 | 4 | 4 | 4 | 4 | 4 | 4 | 4 | 4 | 4 |
| Dispersion Resin | Solsperse 37500 (solid content) | 4 | 4 | 4 | 4 | 4 | 4 | 4 | 4 | 4 | 4 | 4 | 4 | 4 | 4 |
| Solvent | Butyl triglycol | 2 | 2 | — | 5 | — | — | — | 20 | — | 5 | — | — | — | — |
| | Butyl tetraglycol | 10 | 30 | 7 | 30 | — | — | — | 5 | 25 | — | — | 45 | — | 15 |
| | Butyl pentaglycol | 10 | 10 | 7 | 10 | — | — | — | 10 | — | 15 | — | — | — | — |
| | Butyl hexaglycol | 2 | — | 7 | 5 | — | — | — | 15 | — | — | — | — | — | 15 |
| | Dimethyl propylene glycol | — | — | — | — | 10 | — | 30 | — | — | — | 10 | — | — | — |
| | Dimethyl propylene diglycol | — | — | — | — | 10 | 20 | 15 | — | 25 | — | — | — | 45 | — |
| | Dimethyl propylene triglycol | — | — | — | — | 10 | 15 | — | — | — | — | 10 | — | — | — |
| | Methyl triglycol | — | — | — | — | — | — | — | — | — | — | — | — | — | 20 |
| | γ-butyrolactone | 15 | 15 | 15 | 15 | 15 | 15 | 15 | 15 | 15 | 15 | 15 | 15 | 15 | 15 |
| | Methylethyl diglycol | 50 | 32 | 53 | 24 | 44 | 39 | 29 | 24 | 24 | 54 | 54 | 29 | 29 | 24 |
| Surfactant | BYK-340 | 2 | 2 | 2 | 2 | 2 | 2 | 2 | 2 | 2 | 2 | 2 | 2 | 2 | 2 |
| Fixing Resin | PARAPET G-1000P (solid content) | 1 | 1 | 1 | 1 | 1 | 1 | 1 | 1 | 1 | 1 | 1 | 1 | 1 | 1 |
| | Total | 100 | 100 | 100 | 100 | 100 | 100 | 100 | 100 | 100 | 100 | 100 | 100 | 100 | 100 |
| | Ration (X) (mass %) | 83.3 | 64.5 | 66.7 | 57.1 | 33.3 | — | — | 33.3 | — | — | — | — | — | — |
| Evaluation Results | Printing unevenness | 6 | 5 | 6 | 6 | 6 | 6 | 6 | 6 | 4 | 2 | 6 | 3 | 6 | 6 |
| | Glossiness | 6 | 6 | 5 | 6 | 5 | 5 | 4 | 5 | 4 | 5 | 3 | 6 | 2 | 3 |
| | Dot size | 5 | 6 | 6 | 6 | 5 | 6 | 5 | 4 | 5 | 4 | 4 | 5 | 3 | 2 |
| | Surface drying properties | 6 | 5 | 6 | 5 | 6 | 4 | 6 | 6 | 4 | 3 | 4 | 3 | 6 | 6 |

As is clear from the results in Table 1, the printing stability is favorable according to the ink compositions of Examples 1 to 8 that contain the specified solvent group, and it is determined that it is possible to ensure gloss and line width of the printed matter while preventing unevenness in the printed matter by balancing the drying properties of the printed matter and the wetting and spreading of the ink on the medium. By using three or more types of solvent as the specified solvent group, as in Examples 1 to 5 in particular, it is determined that the balance therebetween is favorably maintained. Also in Examples 1 to 5, it is determined that the balance is obtained a high level in each evaluation item with the higher ratio (X) value.

wherein the composition includes, as the solvent, two or more types of solvent that are compounds represented by the following general formula (1), and $R^1$, $R^2$, and $R^3$ have the same structure as one another and m are consecutive integers, in the solvent:

$$R^1O\text{—}(R^2O)_m\text{—}R^3 \quad (1)$$

wherein, in the formula, $R^1$ is a hydrogen atom or an alkyl group with 1 to 6 carbon atoms, $R^2$ is an alkylene group with 2 or 3 carbon atoms, and $R^3$ is a hydrogen atom, an acetyl group, or an alkyl group with 1 to 4 carbon atoms;

both of $R^1$ and $R^3$ are not hydrogen atoms;

m is an integer of 1 to 7; and wherein two or more types of solvent in which one of $R^1$ and $R^3$ in the general formula (1) is a hydrogen atom and another is an alkyl group are included as the two or more types of solvent.

2. The solvent-based ink jet ink composition according to claim 1,
wherein two or more types of solvent in which the number of carbon atoms in $R^2$ in the general formula (1) is 2 are included as the two or more types of solvent.

3. The solvent-based ink jet ink composition according to claim 1,
wherein three or more types of solvent in which m in the general formula (1) are continuously consecutive integers are included as the two or more types of solvent.

4. The solvent-based ink jet ink composition according to claim 3,
wherein n continuously consecutive types of solvent (n is an integer of 3 or more) are included, an integer in which the decimal of n/3 is rounded down is A, and the ratio (X) of the total content of the remaining solvent in the ink, excluding the Ath solvent in which m increases from the solvent with the smallest m and the Ath solvent in which m decreases from the largest m of the n types of solvent to the total content of the n types of solvent in the ink is 40 mass % or more.

5. The solvent-based ink jet ink composition according to claim 1,
wherein the total content of the two or more types of solvent is 2 mass % or more to 50 mass % or less when the total mass of the ink composition is 100 mass %.

6. The solvent-based ink jet ink composition according to claim 1, further comprising:
a lactone as the solvent.

7. The solvent-based ink jet ink composition according to claim 1,
wherein one type selected from a group consisting of an organic pigment, a metal oxide pigment, and carbon black is included as the coloring material.

* * * * *